United States Patent [19]

Price et al.

[11] Patent Number: 5,996,942
[45] Date of Patent: Dec. 7, 1999

[54] AUTONOMOUS SOLAR TORQUE MANAGEMENT

[75] Inventors: Xen Price, Menio Park; Kam Chan, San Jose, both of Calif.

[73] Assignee: Space Systems/Loral, Inc., Palo Alto, Calif.

[21] Appl. No.: 08/934,982

[22] Filed: Sep. 22, 1997

Related U.S. Application Data

[60] Provisional application No. 60/028,594, Oct. 16, 1996.

[51] Int. Cl.⁶ .................................................. B64G 1/36
[52] U.S. Cl. ............................ 244/168; 244/164; 244/165
[58] Field of Search .................................... 244/168, 164, 244/165

[56] References Cited

U.S. PATENT DOCUMENTS

| | | |
|---|---|---|
| 3,304,028 | 2/1967 | Dryden . |
| 4,010,921 | 3/1977 | Pistiner et al. . |
| 4,084,772 | 4/1978 | Muhlfelder .............................. 244/165 |
| 4,272,045 | 6/1981 | Phillips . |
| 4,489,383 | 12/1984 | Schmidt, Jr. ............................ 364/434 |
| 4,506,312 | 3/1985 | Chan et al. . |
| 4,521,855 | 6/1985 | Lehner et al. .......................... 364/434 |
| 4,599,697 | 7/1986 | Chan et al. ............................. 364/434 |
| 4,684,084 | 8/1987 | Fuldner et al. ......................... 244/168 |
| 4,725,024 | 2/1988 | Vorlicek ................................. 244/164 |
| 4,732,354 | 3/1988 | Lievre . |
| 4,758,957 | 7/1988 | Hubert et al. ........................... 364/434 |
| 4,759,517 | 7/1988 | Clark ..................................... 244/168 |
| 4,767,084 | 8/1988 | Chan et al. ............................. 244/164 |
| 4,848,706 | 7/1989 | Garg et al. ............................. 244/169 |
| 4,911,385 | 3/1990 | Agrawal et al. ........................ 244/165 |
| 4,931,942 | 6/1990 | Garg et al. ............................. 364/459 |
| 5,109,346 | 4/1992 | Wertz ..................................... 364/459 |
| 5,133,518 | 7/1992 | Flament . |
| 5,184,790 | 2/1993 | Fowell .................................... 244/165 |
| 5,222,023 | 6/1993 | Liu et al. ................................ 364/434 |
| 5,248,118 | 9/1993 | Cohen et al. . |
| 5,323,322 | 6/1994 | Mueller et al. . |
| 5,349,532 | 9/1994 | Tilley et al. ............................ 364/459 |
| 5,400,252 | 3/1995 | Kazimi et al. .......................... 364/434 |
| 5,452,869 | 9/1995 | Basuthakur et al. .................... 244/164 |
| 5,459,669 | 10/1995 | Adsit et al. ............................. 364/459 |
| 5,626,315 | 5/1997 | Flament et al. . |
| 5,697,582 | 12/1997 | Surauer et al. . |

FOREIGN PATENT DOCUMENTS 0 499 815 A1  8/1992  European Pat. Off. .

OTHER PUBLICATIONS

"Quanternion Feedback for Spacecraft Large Angle Maneuvers", Bong Wie et al., J. Guidance, vol. 8 No. 3, May, Jun. 1985, pp. 360–365.

"Attitude Stabilization of Flexible Spacecraft During Stationkeeping Maneuvers", Bong Wie et al., J. Guidance, vol. 7, No. 4, pp. 430–436, Jul.–Aug. 1984.

*Primary Examiner*—Charles T. Jordan
*Assistant Examiner*—Tien Dinh
*Attorney, Agent, or Firm*—Perman & Green, LLP

[57] ABSTRACT

A method in accordance with this invention for maintaining a spacecraft in a desired orbital configuration, comprises the steps of: (a) recording a history of yaw momentum stored in momentum wheels; (b) estimating an average inertial torque and momentum over a previous time interval (such as one day); (c) determining a desired change in inertial torques using PID control law; (d) commanding a change in satellite trim tab and solar array position from a desired change in solar torque; and (e) slewing the trim tab and solar array a desired amount.

20 Claims, 12 Drawing Sheets

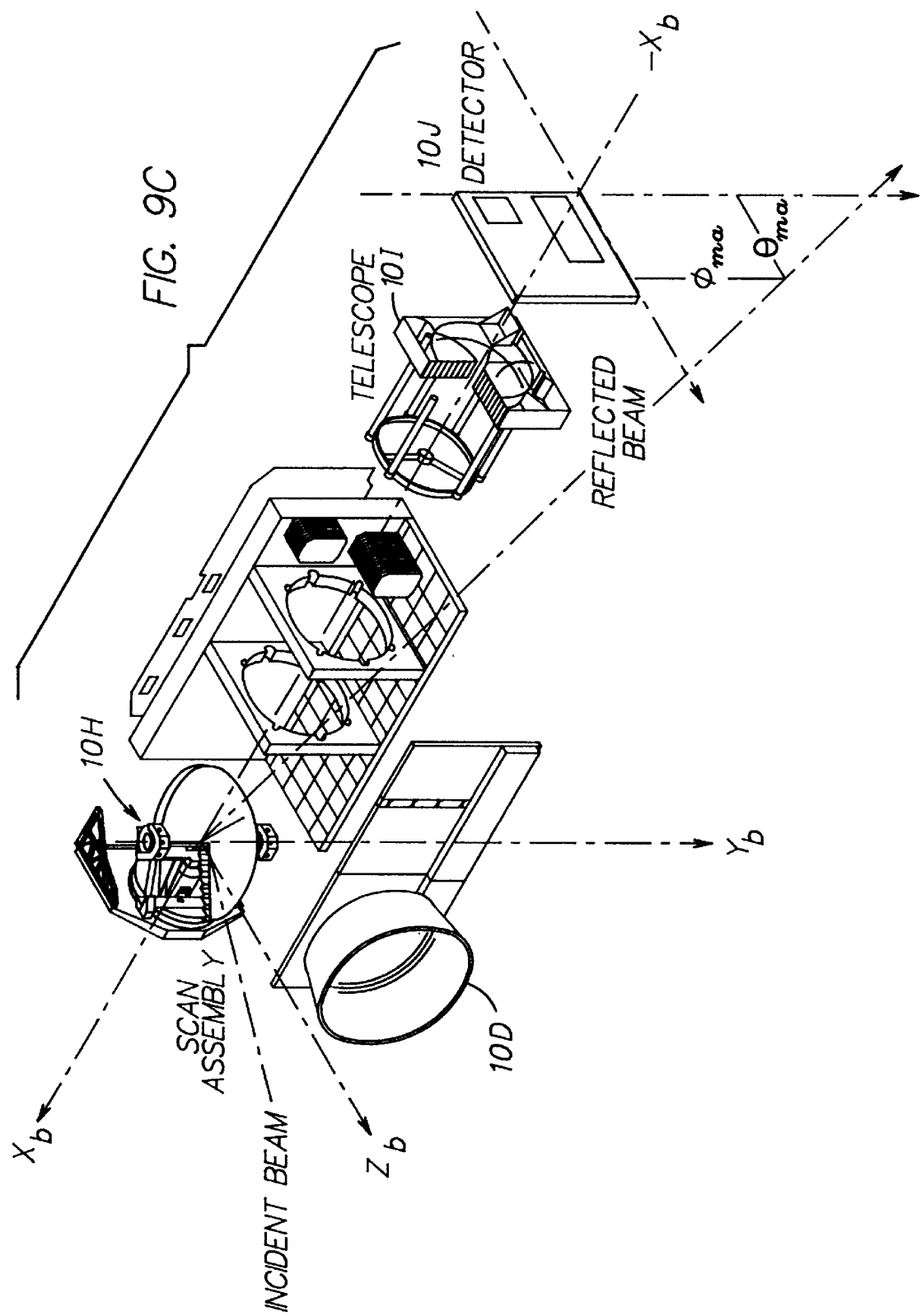

5,996,942

AUTONOMOUS SOLAR TORQUE MANAGEMENT

CLAIM OF PRIORITY FROM A COPENDING PROVISIONAL APPLICATION

This patent application claims priority under 35 U.S.C. §1.119(e) from copending Provisional Patent Application Ser. No. 60/028,594, filed Oct. 16, 1996, entitled "Autonomous Solar Torque Management" by Xen Price et al., the disclosure of which is incorporated by reference herein in its entirety.

FIELD OF THE INVENTION

This invention relates generally to spacecraft and, in particular, to methods and apparatus for maintaining a 3-axis stabilized spacecraft in a desired orbital configuration.

BACKGROUND OF THE INVENTION

Spacecraft perform various maneuvers after they are launched into space and once they are on-station in an intended orbit. After the spacecraft is on-station in a selected orbit, various forces (e.g., solar and/or other environmental disturbance torques, such as magnetic torques) may act on the spacecraft and cause the spacecraft to drift away from its selected orbit into another, incorrect orbit. Thus, periodic (e.g., daily, weekly, or monthly) orbital maneuvers are often required to return the spacecraft to the correct orbit. These types of maneuvers are known as station-keeping maneuvers.

During the performance of each type of maneuver, the precise control of the spacecraft's attitude is essential to orient the spacecraft's payload, such as communication or imaging hardware, to a preselected planetary location and/or to correctly orient the spacecraft's thrust vector. Thus, spacecraft are typically equipped with closed-loop control systems which enable the attitude of the spacecraft to be controlled within pre-established deadband limits. Such control systems often employ spacecraft thrusters for selectively producing torques on the spacecraft for correcting the spacecraft attitude.

The following commonly assigned U.S. patents are illustrative of various approaches to providing spacecraft attitude control: U.S. Pat. No. 5,459,669, Control System And Method For Spacecraft Attitude Control, to Adsit et al.; U.S. Pat. No. 5,400,252, Spacecraft East/West Orbit Control During A North Or South Stationkeeping Maneuver, to Kazimi et al.; U.S. Pat. No. 5,349,532, Spacecraft Attitude Control And Momentum Unloading Using Gimballed And Throttled Thrusters, to Tilley et al.; and U.S. Pat. No. 5,222,023, Compensated Transition For Spacecraft Attitude Control, to Liu et al.

Reference can also be had to U.S. Pat. No. 5,184,790, Two-Axis Attitude Correction For Orbit Inclination, to Fowell; U.S. Pat. No. 4,931,942, Transition Control System For Spacecraft Attitude Control, to Garg et al.; U.S. Pat. No. 4,848,706, Spacecraft Attitude Control Using Coupled Thrusters, Garg et al.; U.S. Pat. No. 4,767,084, Autonomous Stationkeeping For Three-Axis Stabilized Spacecraft, to Chan et al.; U.S. Pat. No. 4,599,697, Digital PWPF Three Axis Spacecraft Attitude Control, to Chan et al.; U.S. Pat. No. 4,521,855, Electronic On-Orbit Roll/Yaw Satellite Control, to Lehner et al.; U.S. Pat. No. 4,489,383, Closed-Loop Magnetic Roll/Yaw Control System For High Inclination Orbit Satellites, to Schmidt, Jr.; and U.S. Pat. No. 4,084,772, Roll/Yaw Body Steering For Momentum Biased Spacecraft, to Muhlfelder.

Also of interest is U.S. Pat. No. 4,759,517, Station-Keeping Using Solar Sailing, to Clark; and U.S. Pat. No. 4,684,084, Spacecraft Structure with Symmetrical Mass Center and Asymmetrical Deployable Appendages, to Fuldner et al.

Reference is also made to a publication entitled "Attitude Stabilization of Flexible Spacecraft During Stationkeeping Maneuvers", Bong Wie et al., J. Guidance, Vol. 7, No. 4, pgs. 430–436, July–August 1984.

A typical geosynchronous satellite is designed to minimize solar torque imbalance. This is typically accomplished with symmetric solar array design, with solar arrays being located on the north and south side of the spacecraft, or in a configuration with the solar array located on the south side, balanced by a solar sail on the north side. These appendages extend from a spacecraft bus. Residual solar and environmental disturbance torques are stored in momentum wheels that are then unloaded periodically using, by example, the spacecraft's thrusters, magnetic torquers, trim tabs, or solar panel angle adjustments.

It can be appreciated that a technique to control inertial roll and yaw solar torques is an important aspect of spacecraft operation, particularly for spacecraft having payloads, such as imaging or communication payloads, that require a high degree of short term attitude stability.

OBJECTS AND ADVANTAGES OF THIS INVENTION

It is a first object and advantage of this invention to provide a method and apparatus to balance a solar torque acting on a spacecraft.

It is a second object and advantage of this invention to provide a method and apparatus to balance both roll and yaw solar torques acting on a spacecraft using a solar array and trim tab that are adjusted in angular position in a controlled fashion.

SUMMARY OF THE INVENTION

This invention provides a method and apparatus to zero a long term roll and yaw momentum accumulation on a spacecraft having a single solar array and trim tab. The use of the teaching of this invention provides enhanced stability in the presence of large solar torques. This invention uses a solar array as a torque adjustment actuator while requiring only a very small solar array misalignment.

Advantages of this invention include: autonomous operation; a balancing of average solar torque through actuator adjustment; a balancing of both roll and yaw torques via a single solar array and trim tab; and tachometer-only direct sensor measurement.

A method in accordance with this invention, for maintaining a spacecraft in a desired orbital configuration, comprises the steps of: (a) recording a history of yaw momentum stored in momentum wheels; (b) estimating an average inertial torque and momentum over a previous time interval (such as one day); (c) determining a desired change in inertial torques using Proportional Integral Derivative (PID) control law; (d) commanding a change in satellite trim tab and solar array position from a desired change in solar torque; and (e) slewing the trim tab and solar array a predetermined amount.

BRIEF DESCRIPTION OF THE DRAWINGS

The above set forth and other features of the invention are made more apparent in the ensuing Description of the Invention when read in conjunction with the attached Drawing, wherein:

FIG. 9C is an elevational, exploded view of the imager payload that includes the imager scan assembly of FIG. 9B, and which further shows spacecraft and imager axes.

DETAILED DESCRIPTION OF THE INVENTION

Figure 1:
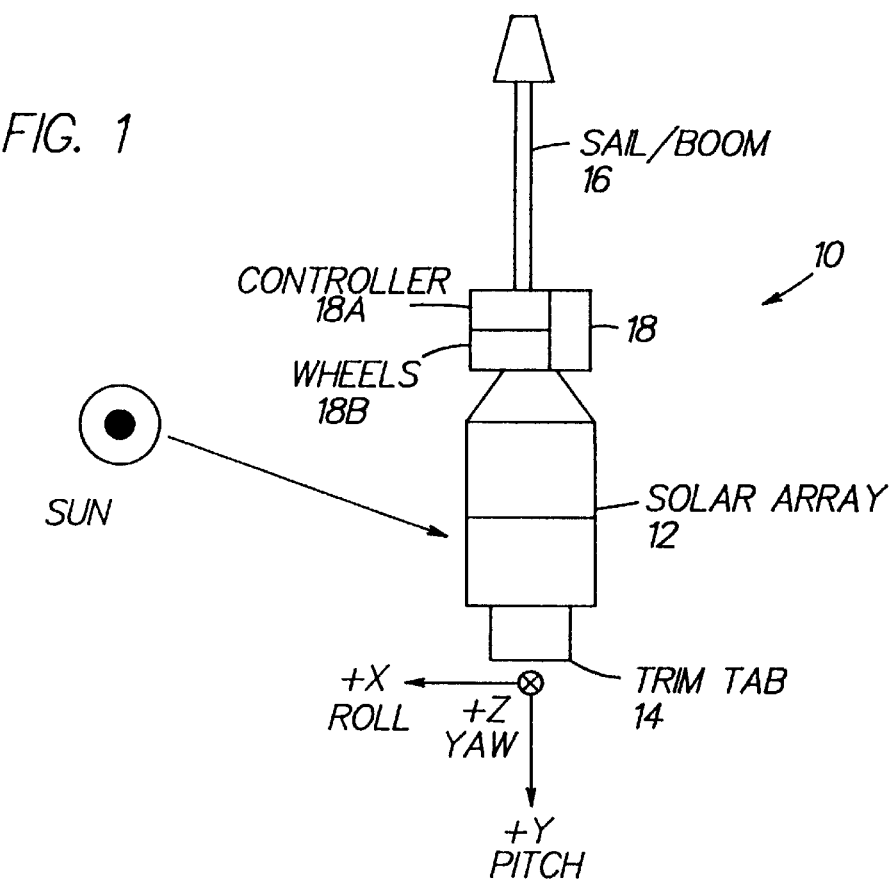
FIG. 1 is diagram of a spacecraft in accordance with this invention.

This invention provides a method and apparatus to zero a long term roll and yaw momentum accumulation on a spacecraft 10 having a single solar array 12, trim tab 14, and a sail/boom appendage 16, all of which extend from a spacecraft bus 18, as shown in FIG. 1. The spacecraft bus 18 is assumed to contain a programmable controller 18A, such as a microprocessor, and a three axis, momentum wheel based stabilization system 18B.

Figure 9A:
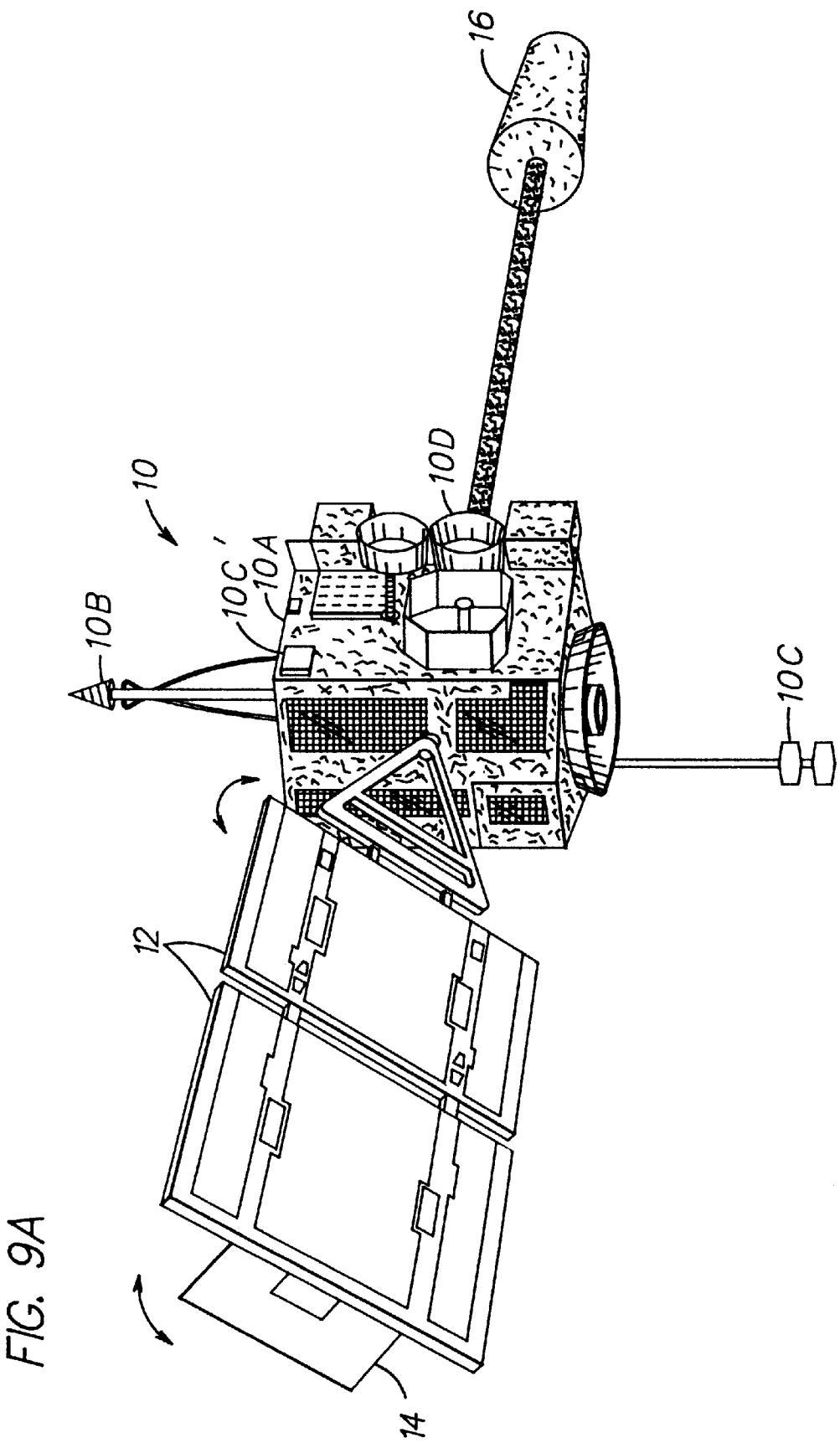
FIG. 9A is an elevational view of a spacecraft that is suitable for practicing this invention.
Figure 9B:
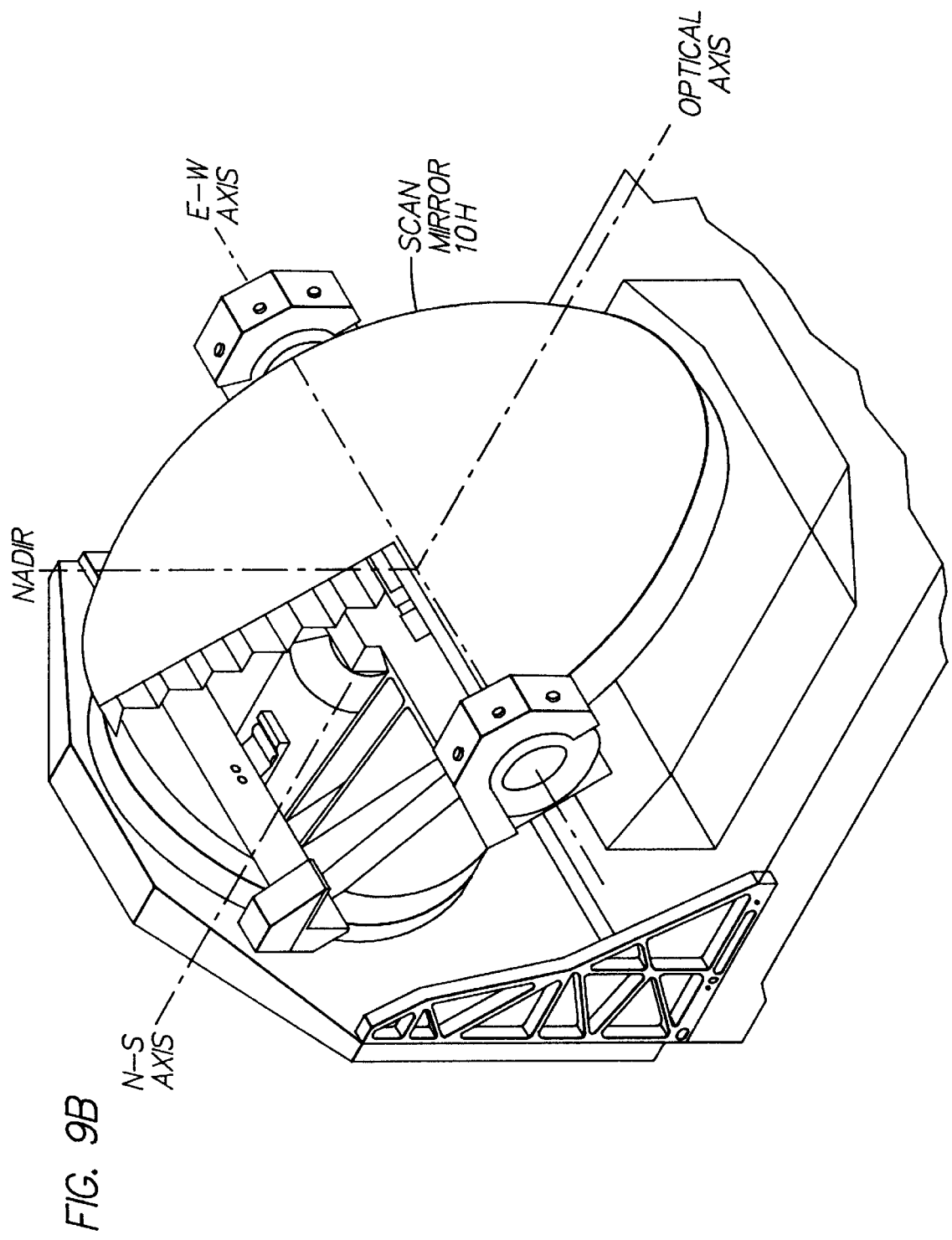
FIG. 9B is an elevational view of an imager scan assembly that forms a portion of the payload of the spacecraft of FIG. 9A.
Figure 9D:
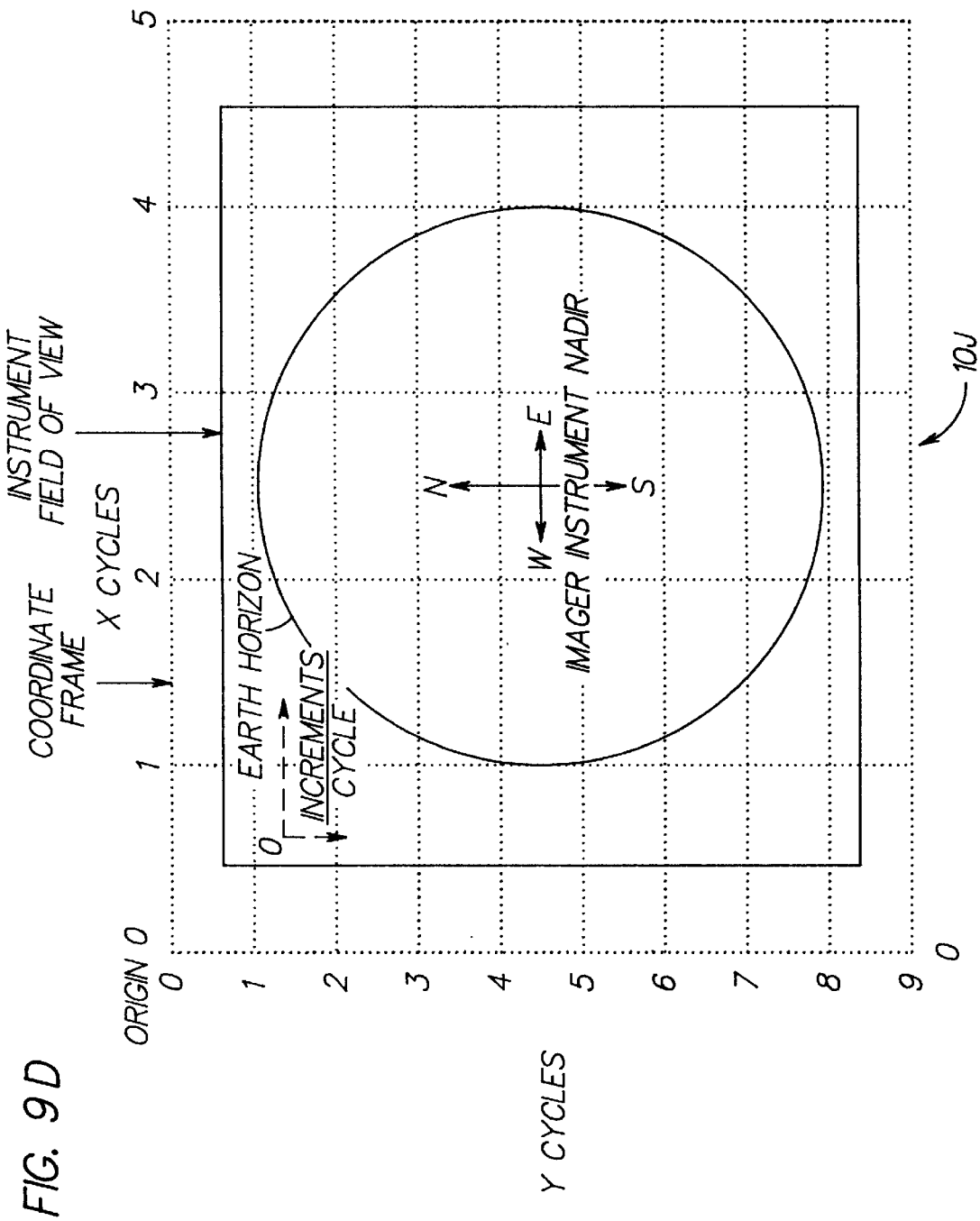
FIG. 9D illustrates the imager coordinate frame of the imager shown in FIG. 9C.

Reference is made to FIGS. 9A–9D for showing an exemplary embodiment of the spacecraft 10 in greater detail. The spacecraft 10 includes a bus 10A from which protrudes a telemetry and control (T&C) antenna 10B, a magnetometer 10C, an Earth sensor 10C', and an entrance aperture 10D of an imager payload. Also attached to the bus 10A are the solar panels 12, which support the trim tab 14, and the solar sail 16. FIG. 9B shows a portion of the imaging payload, in particular a scan mirror 10H and its associated components. FIG. 9C illustrates the orientation of the scan mirror assembly and scan mirror 10H to the optical aperture 10D, as well as to a telescope 10I and detector 10J. The various spacecraft and imager axes are also shown. FIG. 9D illustrates the coordinate frame of the imager 10J, and shows an exemplary image of the earth overlaid on the imager.

Figure 8:
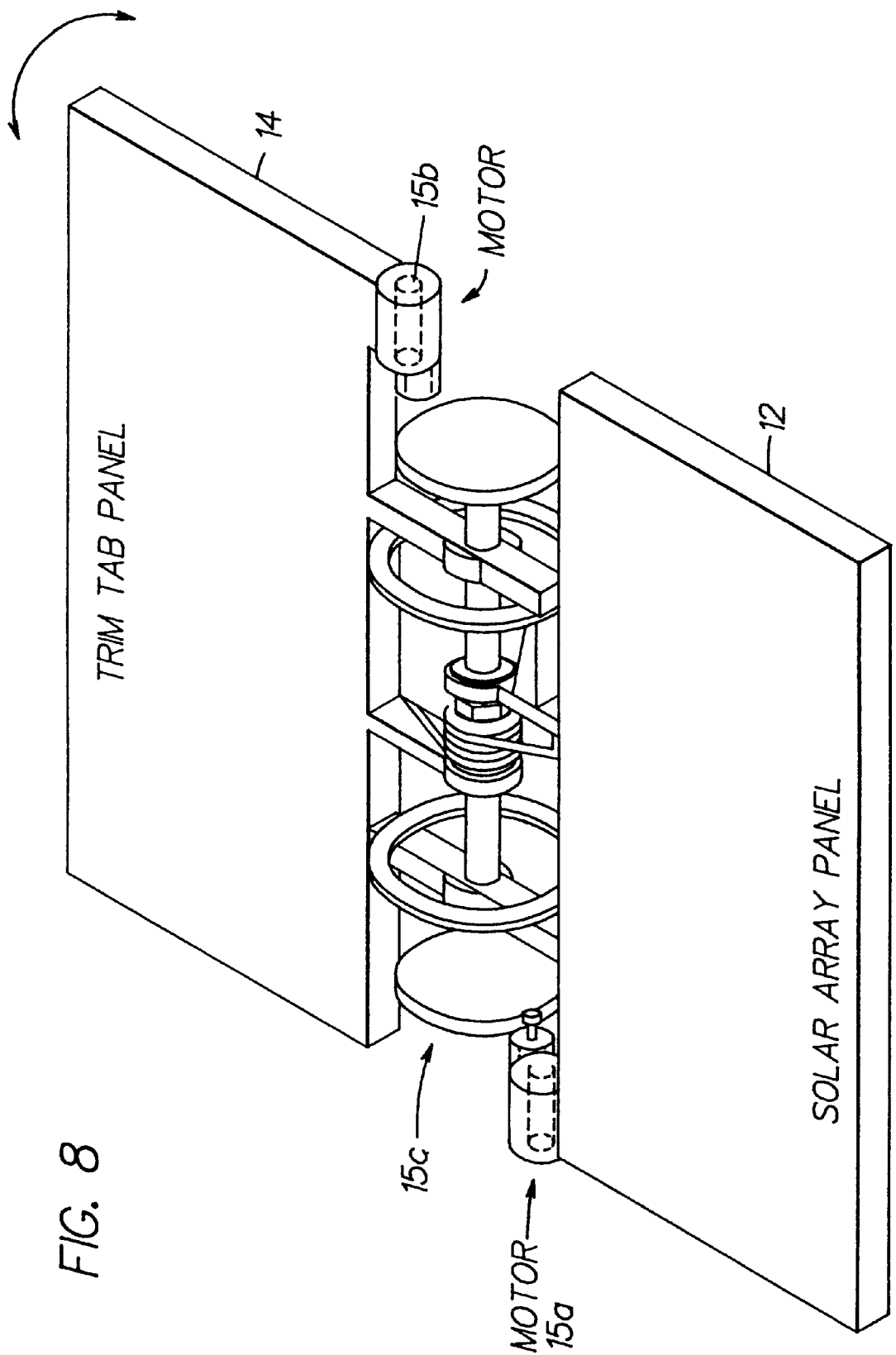
FIG. 8 is an elevational view showing the solar array panel and trim tab in greater detail.

FIG. 8 shows in greater detail a portion of the solar array panel 12 and the trim tab panel 14. A pair of stepper motors 15a and 15b work in conjunction with a rotational mechanism 15c for adjusting, in discrete steps, an angular orientation of the trim tab panel 14 with respect to the solar array panel 14. The angular orientation of the solar array panel 12 with respect to the body of the spacecraft 10 can also be similarly adjusted. Suitable dimensions for the solar arrays are 100×100 inches, for a total solar panel (two arrays) dimension of 200×100 inches. Exemplary dimensions for the trim tab 14 are 70 inches (width) by 50 inches (length).

This invention provides enhanced stability in the presence of large solar torques, and uses the solar array 12 as a torque adjustment actuator while requiring only a very small solar array misalignment from a normal sun-pointing configuration.

Advantages of this invention include: autonomous operation; a balancing of average solar torque through actuator adjustment; a balancing of both roll and yaw torques via the single solar array 12 and trim tab 14; and tachometer-only direct sensor measurement.

This invention employs a novel method for on-board autonomous control of inertial roll and yaw solar torque management. This approach is applicable to any three axis, wheel controlled spacecraft that includes the on-board processor 18A, a solar array 12, and a trim tab 14. Although FIGS. 1 and 8 illustrate one such spacecraft configuration, the illustrated configuration should not be viewed as a limitation on the practice of this invention.

The presently preferred controller topology and algorithm permit control of the inertial roll and yaw solar torque at its source. The on-board controller 18A uses only measured wheel speed as an input and produces commanded trim tab 14 and solar array 12 angular adjustments at periodic intervals, such as twice per day. The angular adjustments of these optical surfaces serves to control the inertial roll and yaw solar torque directly. Hence roll/yaw momentum are maintained to within a desired operating range, obviating or reducing the need to perform momentum unloads with spacecraft thrusters. This advantage is particularly important when using payloads that require a high level of short term attitude stability, such as imaging and certain communications payloads.

Figure 2:
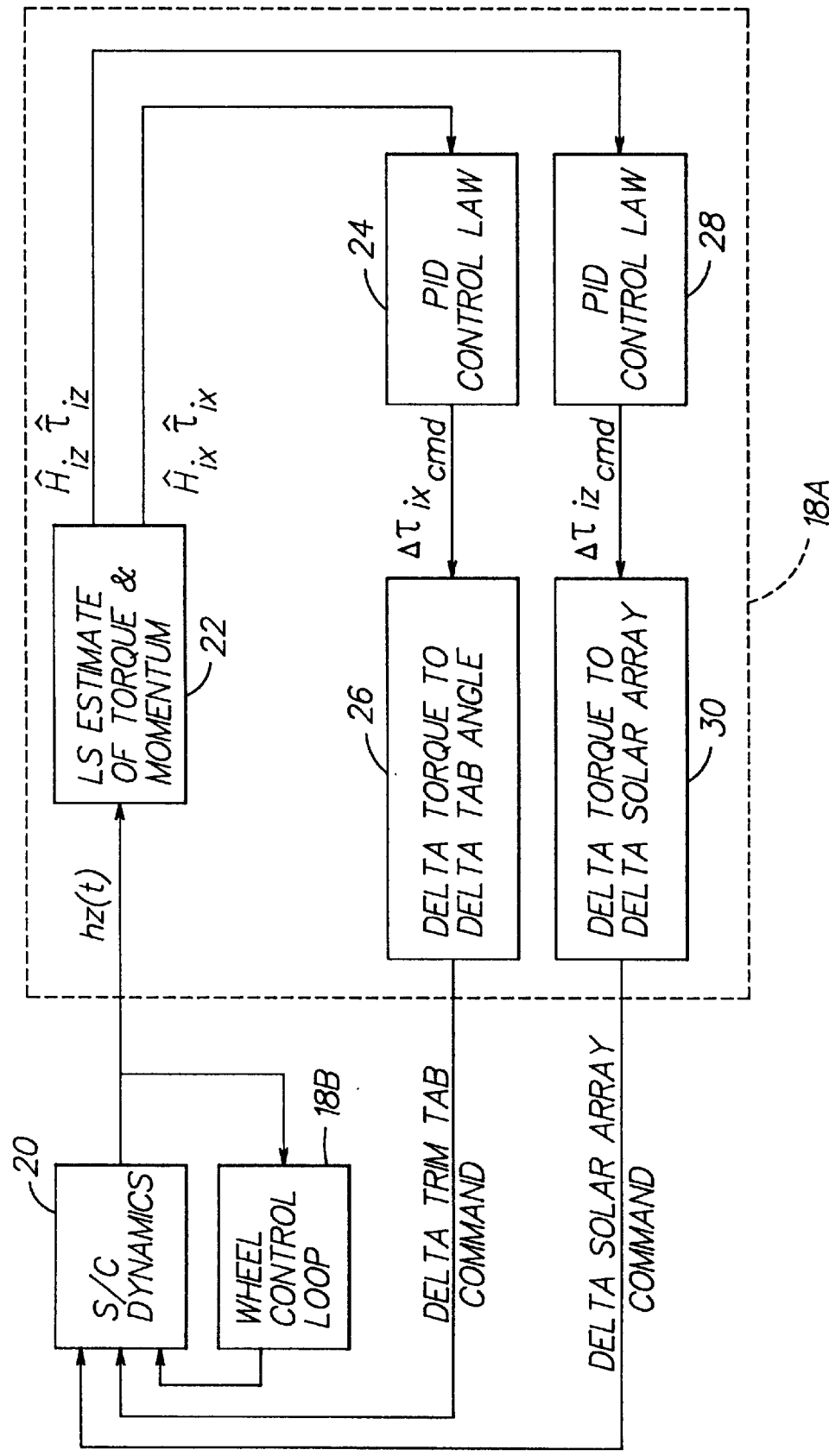
FIG. 2 is a block diagram of a solar sailing control system in accordance with this invention.

FIG. 2 depicts the controller 18A having an input coupled to an output of a spacecraft dynamics (S/C dynamics) 20 and the momentum wheel control loop 18B. The controller 18A includes a Least Squares (LS) Estimate of Torque and Momentum block 22 which provides outputs to a trim tab control channel and to a solar array control channel. The LS block 22 estimates inertial momentum and torque from yaw momentum. The trim tab control channel includes a first Proportional Integral Derivative (PID) control law block 24 coupled to a delta torque to delta trim tab angle control block 26. The solar array control channel includes a second PID control law block 28 coupled to a delta torque to delta solar array angle control block 30. Desired changes in inertial torques are computed using the PID control law blocks 24 and 28. Control blocks 26 and 28 provide delta trim tab angle commands and delta solar array angle commands, respectively, to the trim tab 14 and solar array 12, which are assumed to form a part of the S/C dynamics block 20. The adjustable trim tab 14 is used for making inertial roll adjustments, while the adjustable solar array is used for making inertial yaw adjustments. In a preferred embodiment of the invention the delta trim tab angle commands and delta solar array angle commands are updated twice per 24 hours, although other update intervals could be used.

The presently preferred least squares (LS) technique is described below.

The LS model of yaw momentum that is periodically solved by the LS estimator block 22 is given by the following expression.

$hz(t) = X_1 + X_2 \cos(w_0 t) + X_3 \sin(w_0 t) + X_4 t \cos(w_0 t) + X_5 t \sin(w_0 t) + X_6$ cos$2w_0 t$)+$X_7$ sin ($2w_0 t$)

The physical meaning of the foregoing LS model parameters is as follows.

$X_1$—radiance gradiance and hz (yaw momentum) bias
$X_2$—inertial roll momentum
$X_3$—inertial yaw momentum
$X_4$—inertial roll torque
$X_5$—inertial yaw torque
$X_6$ & $X_7$—torque from communication antennas,
wherein $X_1$, $X_6$ and $X_7$, although solved for, are subsequently ignored by the PID control law blocks 24 and 28, or are simply not output to the PID control law blocks 24 and 28.

Figure 7:
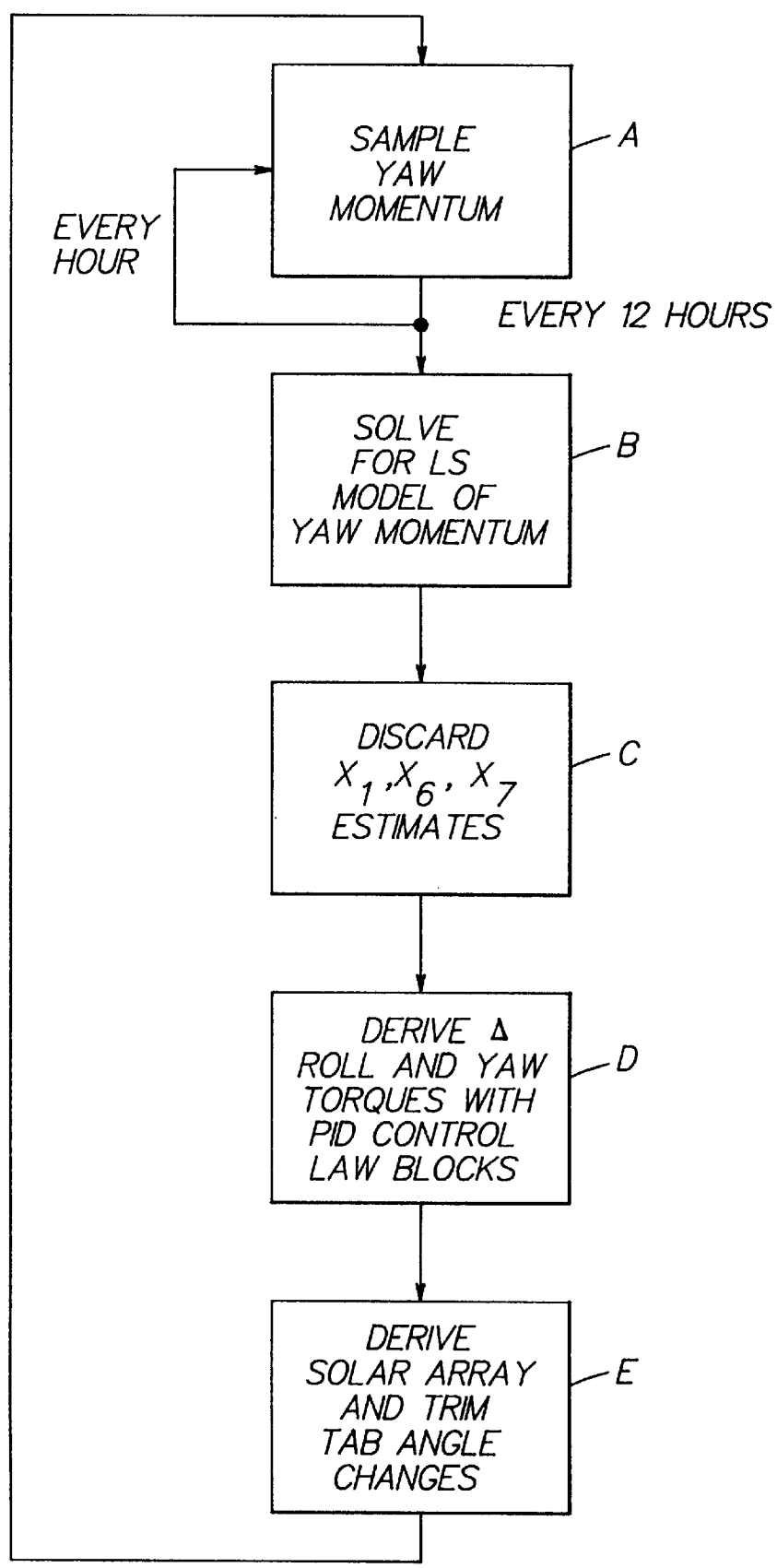
FIG. 7 is a logic flow diagram that illustrates a method in accordance with this invention.

In accordance with a method of this invention, and referring to FIG. 7, at Block A the LS controller 22 periodically samples the yaw momentum. By example, the yaw momentum is sampled 24 times per 24 hours. At Block B the controller 22 periodically solves for the LS model, for example twice per 24 hours, each time using the sampled yaw momentum for the previous 12 hours. At Block C the controller 22 discards the radiance gradiance and antenna torque parameters ($X_1$, $X_6$, and $X_7$), as it has been found that it is not necessary to adjust for their effects. At Block D the estimated momentum and torques are employed by the PID control law blocks 24 and 28 to derive changes in (i.e., delta) roll and yaw torques, and at Block E the delta roll and yaw torques are acted on by delta torque controllers 26 and 30 to adjust the angle of the trim tab 14 and the angle of the solar array 12. At Block E the controller 22 holds the torque parameters if a spacecraft thruster has been fired during some predetermined prior interval, such as 12 hours. Firing the thruster has been found to corrupt the torque estimate. As such, only the momentum estimate is used in Block E, in conjunction with the previous torque estimate.

The conversion from the commanded torque to a change in angle for the solar array 12, performed by the delta torque to delta solar array angle controller 30, is a linear process, wherein small misalignments in the angle of the solar array 12 produce "pure" inertial yaw torque.

The conversion from the commanded torque to a change in angle for the trim tab 14, performed by the delta torque to delta tab angle controller, is instead proportional to the cosine of the sun vector and the trim tab normal. As such, a knowledge of sun declination is required on the spacecraft.

Figure 3:
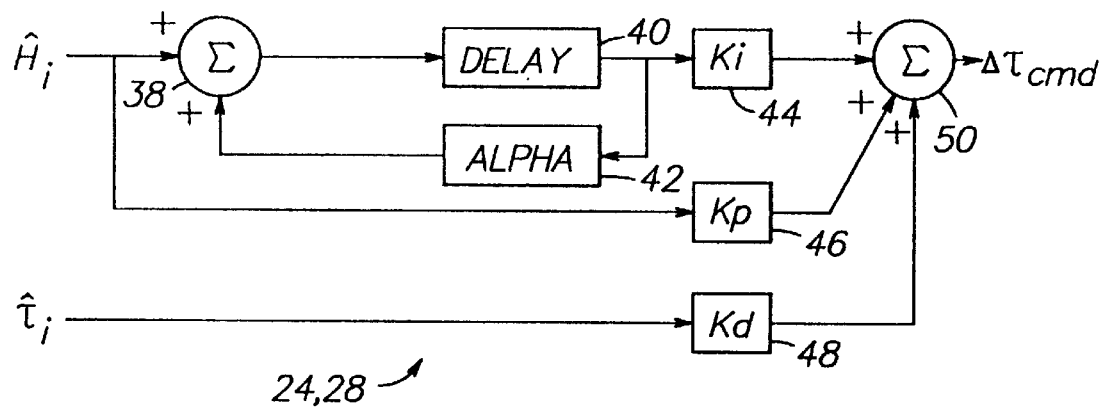
FIG. 3 is a block diagram of a PID control law system controller in accordance with this invention.

FIG. 3 is a block diagram representative of the PID control law blocks 24 and 28. Input summing node 38 provides an output to a delay block 40 which represents the summation of input samples. The alpha block 42 represents a "leaky" integrator function, thereby effectively reducing the effect or weight of older yaw or roll momentum estimate values. The output of delay block 40 is applied to an integral gain block (Ki) 44, which provides an output to summing node 50. Also applied to the summing node 50 is an output of a position gain block 46, which receives the momentum estimate output from LS estimate block 22, and an output of a derivative gain block 48, which receives the torque estimate output from LS estimate block 22. The output of the summation block 50 is a delta torque command signal, which is applied to the appropriate delta torque to delta tab angle control block 26 or the delta torque to delta solar array angle control block 30.

In a computer simulation of this invention the input disturbances where as follows: the radiance gradiance (later discarded by the algorithm), an earth sensor (ES) 10C' thermal distortion, a continuously changing solar torque (representing seasonal changes), a magnetic field variation, including storms (which is partially compensated if estimatable), and the S/C dipole, fixed=[555] (solar array fixed with respect to spacecraft body) and rotating=[003] (solar array rotates with respect to the spacecraft body).

A description of the simulations is as follows. The summer solstice (SS) solar torque was established assuming a nominal earth's magnetic B-field. The autumn equinox (AQ) solar torque was established assuming a moderate magnetic storm, as was the winter solstice (WS) solar torque, with station keeping. The AQ solar torque further assumed a (daily) pitch unload and a yaw (momentum) unload.

Figure 4A:
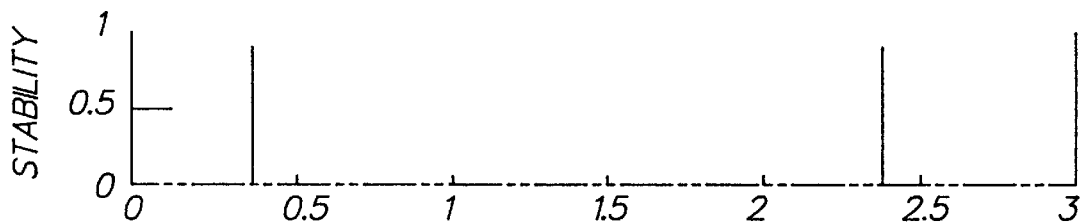
FIGS. 4A and 4B are graphs illustrating the stability characteristics of the PID controller of FIG. 3.
Figure 4B:
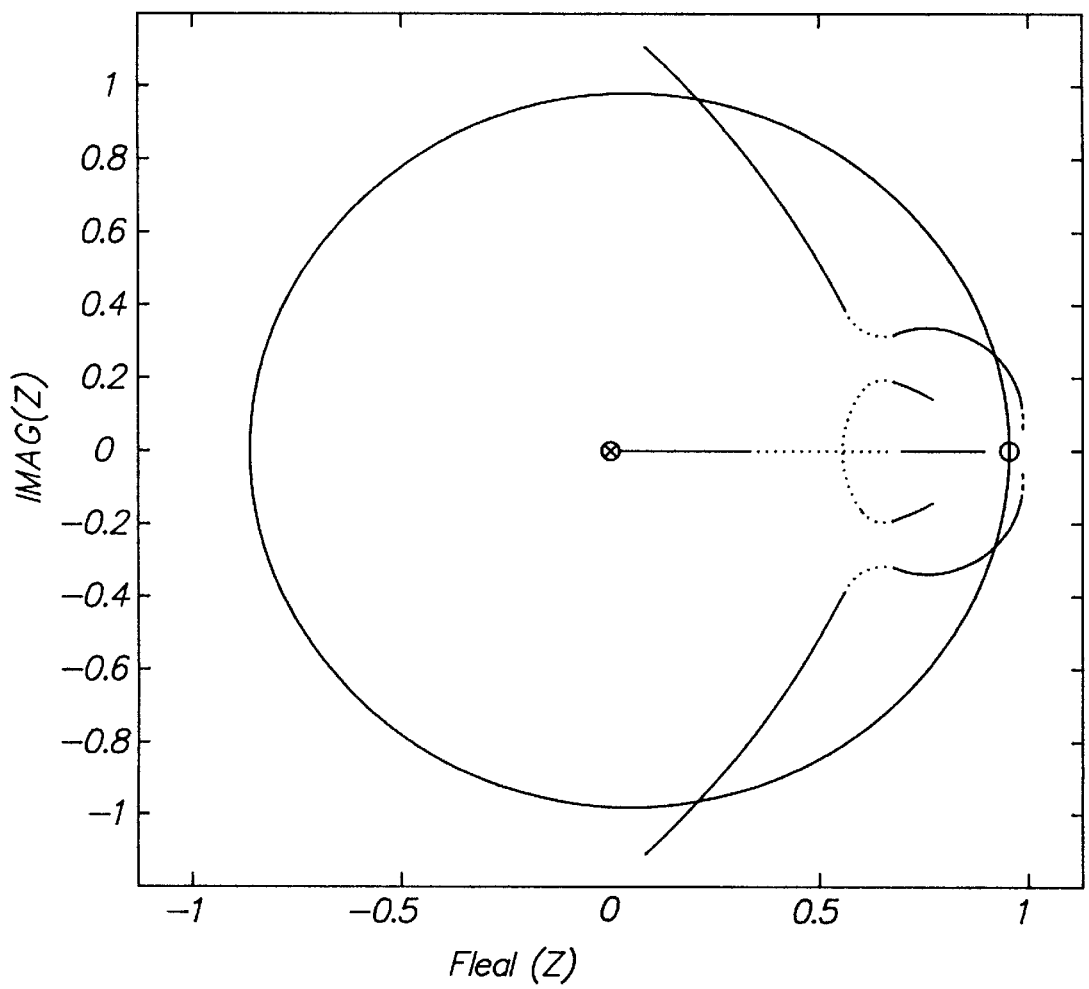
Figure 5A:
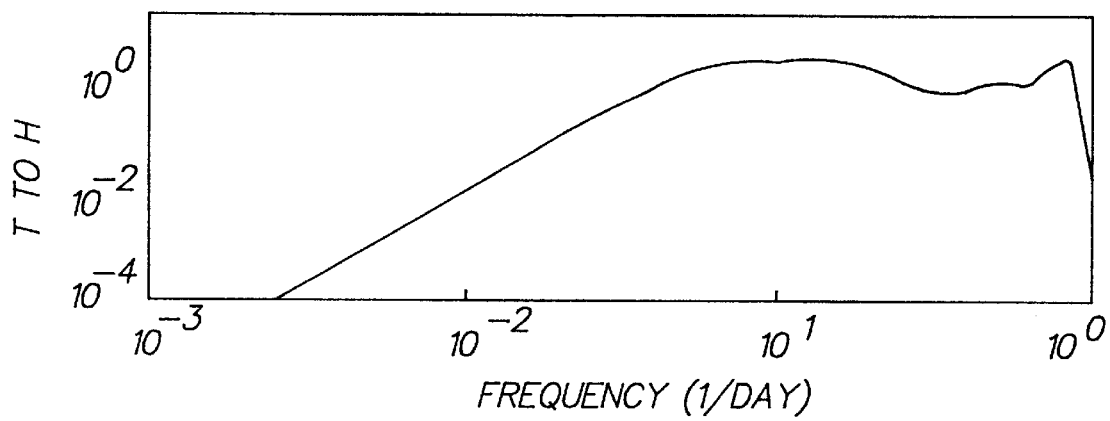
FIGS. 5A–5C are graphs illustrating the closed loop frequency response characteristics of the PID controller of FIG. 3.
Figure 5B:
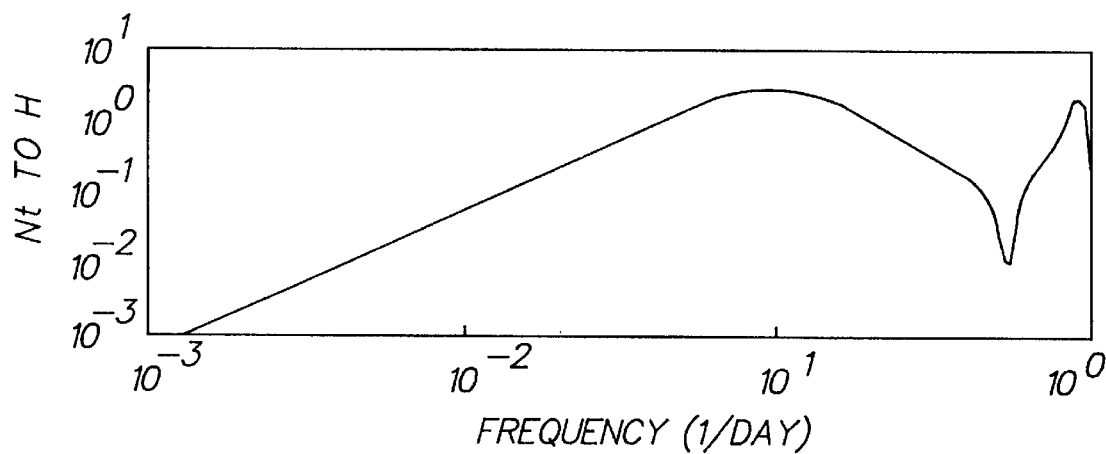
Figure 5C:
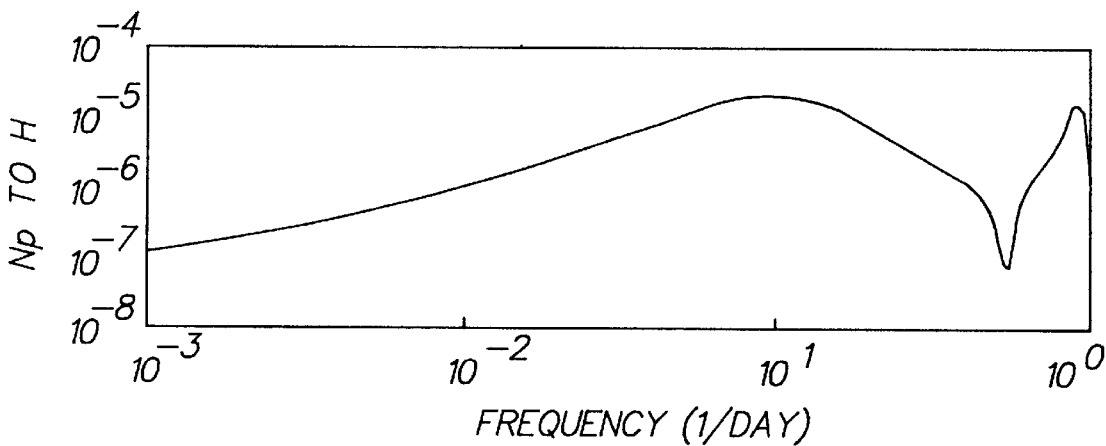
Figure 6A:
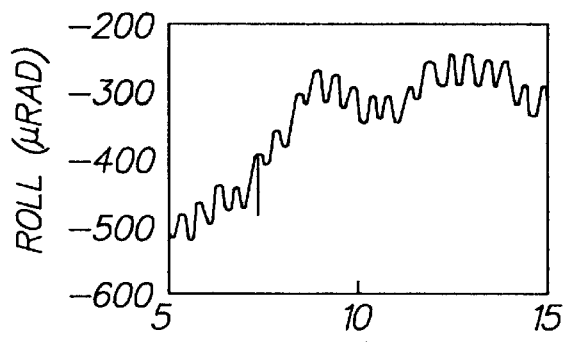
FIGS. 6A–6H are graphs illustrating a result of a long term simulation of the operation of the invention, the simulation assuming a V-mode operation with solar sailing and a station keeping transient.
Figure 6B:
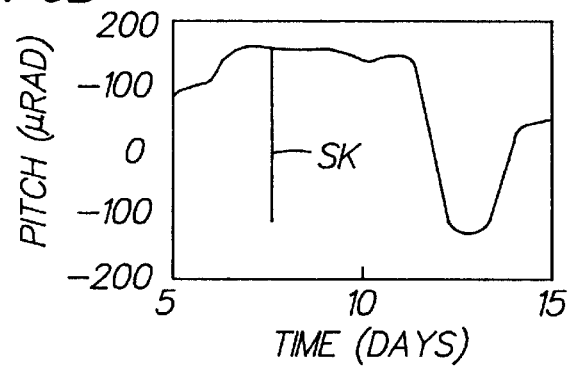
Figure 6C:
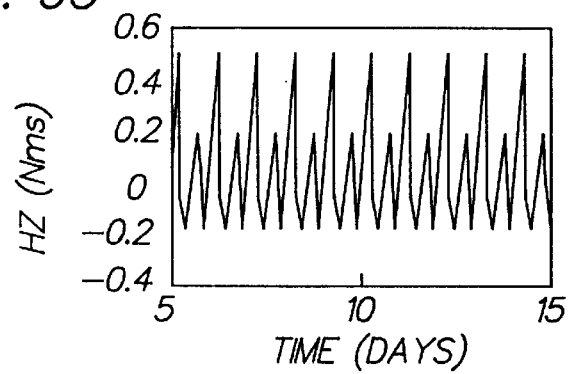
Figure 6D:
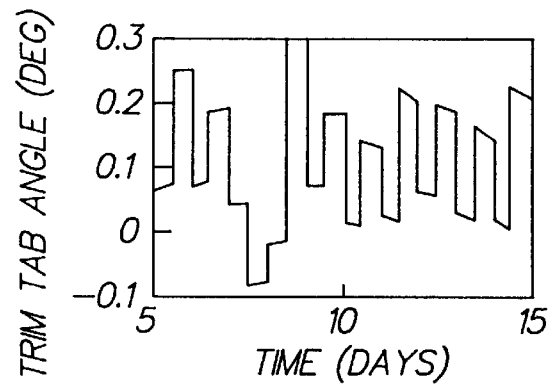
Figure 6E:
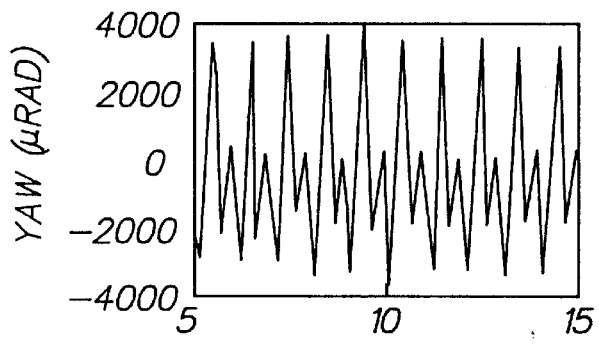
Figure 6F:
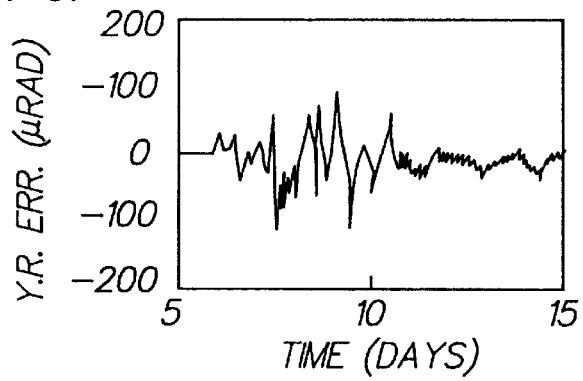
Figure 6G:
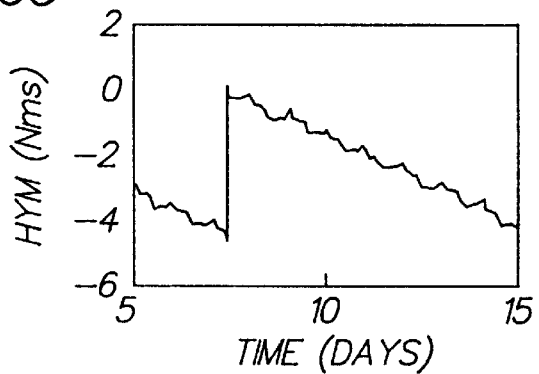
Figure 6H:
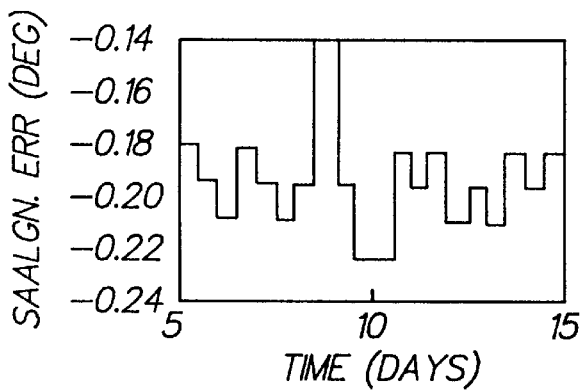

FIGS. 4A and 4B are graphs illustrating modeled stability characteristics of the PID controller of FIG. 3; FIGS. 5A–5C are graphs illustrating modeled closed loop frequency response characteristics of the PID controller of FIG. 3; and FIGS. 6A–6H are graphs illustrating a result of a long term (15 day) simulation of the operation of the invention. These graphs assume V mode operation, and a single station keeping (SK) transient is shown occurring about day 7.

V mode refers to operation with both momentum wheels (M1 and M2), which is normal operation, as opposed to an L mode that would refer to operation with one momentum wheel and a reaction wheel (RW), referred to as the L1 mode when operating with M1 and the RW, or as the L2 mode when operating with M2 and the RW.

In the management of solar torque disturbances this invention has been found maximize yaw attitude stability for imaging and other spacecraft missions, to provide automatic long-term roll/yaw momentum management without requiring thruster unloads, and to prevent excessive hz (yaw) momentum accumulation in the momentum wheels 18B, all by using minimal angular trim tab and solar array adjustments (e.g., twice per day, spaced 12 hours apart). The angular adjustments of the solar array 12 and trim tab 14 can be performed while imaging. The solar array angular adjustments can be performed by adding or dropping double steps (0.014°/double step) from the nominal sun tracking angle at orbital rate. The use of this invention has been found to have no impact on line of sight (LOS) stability of the imager payload. The frequency of adding or dropping double steps is low, thus minimizing any disturbance to the pitch loop. The frequency of trim tab stepping (e.g., 0.01875°/step) is also low, thereby minimizing any disturbance to the short term momentum wheel control (LQG) loop. Furthermore, a single trim tab step produces less than 2×0.16=0.32 μrads of roll/yaw error (see FIG. 6F). Successive steps are deadbeat to minimize any excitation of the first out-of-plane bending mode. In general, the worst-case adjustment angles (normal operations) can be less than 1° for the trim tab 14 and 0.2° for the solar array 12 (see FIGS. 6D and 6H).

While the invention has been particularly shown and described with respect to preferred embodiments thereof, it will be understood by those skilled in the art that changes in form and details may be made therein without departing from the scope and spirit of the invention.

What is claimed is:

1. A method for maintaining a spacecraft in a desired orbital configuration, said spacecraft being exposed to external torque disturbances, including solar torque disturbances, the method comprising the steps of:

periodically sampling and recording a history of yaw momentum from an output of momentum wheels;

periodically estimating, from the recorded history, inertial disturbance torques and momentum expressed in a frame that is substantially inertial;

determining a desired change in inertial torques from the estimated inertial disturbance torques and momentum;

commanding a change in at least one of satellite trim tab and solar array angular position based on the desired change in inertial torques; and slewing the trim tab and the solar array so as to obtain the desired change in inertial torques to maintain roll and yaw momentum within predetermined limits.

2. A method as in claim 1, wherein the step of periodically estimating employs a least squares estimation technique.

3. A method as in claim 1, wherein the yaw momentum is sampled n times per day, and wherein the step of periodically estimating is accomplished m times per day.

4. A method as in claim 3, wherein n=24 and wherein m=2.

5. A method as in claim 1, wherein the step of determining employs a Proportional Integral Derivative (PID) control law.

6. A method as in claim 2, wherein a least squares model of yaw momentum that is periodically estimated is given by, $$hz(t)=X_1+X_2 \cos (w_0 t)+X_3 \sin (w_0 t)+X_4 t \cos (w_0 t)+X_5 t \sin (w_0 t)+X_6 \cos(2w_0 t)+X_7 \sin (2w_0 t)$$

where, $X_1$—radiance gradiance and hz (yaw momentum) bias $X_2$—inertial roll momentum $X_3$—inertial yaw momentum $X_4$—inertial roll torque $X_5$—inertial yaw torque $X_6$ & $X_7$—torque from communication antennas; and wherein $X_1$, $X_6$ and $X_7$ are ignored when executing the step of determining.

7. A method as in claim 1, wherein the step of commanding includes a step of converting from the desired torques to angular position changes, the converting step using a linear process for the solar array, and, for the trim tab, a process that is proportional to the cosine of the sun vector and trim tab normal.

8. A method as in claim 1, wherein the step of slewing changes the solar array in double steps, and the trim tab in steps.

9. A method as in claim 8, wherein a solar array double step is equal to 0.014 degree that is added to or subtracted from nominal solar array sun tracking.

10. A method as in claim 8, wherein a trim tab step is equal to 0.01875 degree.

11. A method as in claim 1, wherein the step of determining uses only the estimated momentum if a spacecraft thruster was fired within a predetermined interval of time.

12. A three axis stabilized spacecraft comprising momentum wheels, a rotatable solar array, and a rotatable trim tab, said spacecraft further comprising a roll and yaw momentum management system comprised of:

a least squares estimator of inertial yaw and roll torque and momentum having an input coupled to said momentum wheels, said least squares estimator operating m times per day on yaw momentum values that are sampled m times per day from said momentum wheels;

coupled to an output of said least squares estimator, a unit for periodically estimating momentum and inertial disturbance torques expressed in a frame that is substantially inertial, said unit comprising a first, solar array Proportional Integral Derivative (PID) control law block outputting a required change in inertial yaw torque and a second, trim tab PID control law block outputting a required change in inertial roll torque; and coupled to an output of said first PID block, means for rotating said solar array by an angular amount specified by said required change in inertial yaw torque and means for rotating said trim tab by an angular amount specified by said required change in inertial roll torque.

13. A spacecraft as in claim 12, wherein n=24, wherein m=2.

14. A spacecraft as in claim 12, wherein a least squares model of yaw momentum that is solved by said least squares estimator is given by, $$hz(t)=X_1+X_2 \cos (w_0 t)+X_3 \sin (w_0 t)+X_4 t \cos (w_0 t)+X_5 t \sin (w_0 t)+X_6 \cos(2w_0 t)+X_7 \sin (2w_0 t)$$

where, $X_1$—radiance gradiance and hz (yaw momentum) bias $X_2$—inertial roll momentum $X_3$—inertial yaw momentum $X_4$—inertial roll torque $X_5$—inertial yaw torque $X_6$ & $X_7$—torque from communication antennas; and wherein only $X_2$, $X_3$, $X_4$, and $X_5$ are used by said PID control law blocks.

15. A method for operating a spacecraft that is exposed to external torque disturbances, the method comprising the steps of:

providing on the spacecraft at least one momentum wheel having an output;

operating a controller that has an input coupled to the output of the at least one momentum wheel for periodically sampling and recording in a memory a history of momentum wheel speed; and further operating the controller for periodically estimating, from the recorded history of momentum wheel speed, momentum and inertial disturbance torques expressed in a frame that is substantially inertial.

16. A method as in claim 15, and further comprising steps of:

determining a desired change in inertial torques from the estimated inertial disturbance torques and momentum;

commanding a change in at least one of satellite trim tab and solar array angular position based on the desired change in inertial torques; and slewing the trim tab and the solar array so as to obtain the desired change in inertial torques to maintain roll and yaw momentum within predetermined limits.

17. A method as in claim 16, wherein the step of periodically estimating employs a least squares estimation technique, and wherein the step of determining employs a Proportional Integral Derivative (PID) control law.

18. A method as in claim 15, wherein the wheel speed is sampled n times per day, and wherein the step of periodically estimating is accomplished m times per day, where n is greater than m.

19. A method as in claim 16, wherein the step of slewing changes the solar array in double steps and the trim tab in steps, wherein a solar array double step is equal to about 0.014 degree that is added to or subtracted from nominal solar array sun tracking, and wherein a trim tab step is equal to about 0.01875 degree.

20. A method as in claim 16, wherein the step of determining uses only the estimated momentum if a spacecraft thruster was fired within a predetermined interval of time.

* * * * *